(12) United States Patent
Cruz

(10) Patent No.: US 6,638,387 B2
(45) Date of Patent: Oct. 28, 2003

(54) EMBOSSED-IN-REGISTER MANUFACTURING PROCESS

(75) Inventor: Eugenio Cruz, Cuenca (ES)

(73) Assignee: Industrias Auxiliares Faus S.L., Gandia (ES)

(*) Notice: Subject to any disclaimer, the term of this patent is extended or adjusted under 35 U.S.C. 154(b) by 213 days.

(21) Appl. No.: 09/903,807

(22) Filed: Jul. 13, 2001

(65) Prior Publication Data

US 2003/0010427 A1 Jan. 16, 2003

(51) Int. Cl.[7] .................................................. B31F 1/07
(52) U.S. Cl. ...................... 156/219; 156/209; 156/220; 428/537.5
(58) Field of Search ................................ 156/209, 219, 156/220, 581, 583.1; 428/535, 537.1, 537.5

(56) References Cited

U.S. PATENT DOCUMENTS

| | | |
|---|---|---|
| 2,108,226 A | 2/1938 | Johnston |
| 3,373,068 A | 3/1968 | Grosheim et al. |
| 3,814,647 A * | 6/1974 | Scher et al. ............... 156/219 |
| 4,284,453 A * | 8/1981 | Endrizzi ..................... 156/154 |
| 4,367,110 A | 1/1983 | Yoshikawa |
| 4,376,812 A | 3/1983 | West |
| 4,396,448 A | 8/1983 | Ohta et al. |
| 4,599,127 A | 7/1986 | Cannady, Jr. et al. |
| 4,689,102 A | 8/1987 | Prawdzik et al. |
| 5,413,834 A * | 5/1995 | Hunter et al. ............... 428/121 |
| 5,723,221 A * | 3/1998 | Brooker et al. ............ 428/469 |
| 5,858,160 A | 1/1999 | Piacente et al. |
| 5,961,903 A | 10/1999 | Eby et al. |
| 6,114,008 A | 9/2000 | Eby et al. |
| 2002/0160680 A1 * | 10/2002 | Laurence et al. |

FOREIGN PATENT DOCUMENTS

| | | |
|---|---|---|
| EP | 1 153 736 A1 | 11/2001 |
| EP | 0 888 215 B1 | 6/2002 |
| EP | 1 225 033 A1 | 7/2002 |
| EP | 0 883 487 B1 | 10/2002 |
| ES | 163421 U | 5/1971 |
| ES | 460194 A | 5/1978 |
| ES | 283331 U | 5/1985 |
| ES | 1019585 U | 4/1992 |
| WO | WO-97/31776 A1 | 9/1997 |

OTHER PUBLICATIONS

Eugenio Cruz Garcia; "New Direct Laminated Floor"; U.S. patent application No. 09/460,117, filed Dec. 13, 1999.

* cited by examiner

*Primary Examiner*—Jeff H. Aftergut
*Assistant Examiner*—Jessica Rossi
(74) *Attorney, Agent, or Firm*—McKenna Long & Aldridge LLP

(57) ABSTRACT

A method of producing embossed-in-register building products. Reference edges are milled on a board. A resin soaked paper having a decorative motif is located on that board using the reference edges as a guide such that the decorative motif has a predetermined position relative to the reference edges. The board and paper are then located in a press machine having a press plate with a three dimensional surface that is registered with the decorative motif. The press plate presses into the board and paper at a predetermined pressure and predetermined temperature to set the resin, producing a final product. Resin and paper parameters are carefully controlled. The press plate is manufactured such that the plate's surface registers with the decorative motif when the press plate is hot. Appropriate hollowing and milling of the board can even out pressure distributions and to provide a completely closed surface without porosity.

11 Claims, 3 Drawing Sheets

EMBOSSED-IN-REGISTER MANUFACTURING PROCESS

BACKGROUND OF THE INVENTION

1. Field of the Invention

The present invention relates to laminated materials. More particularly, the present invention relates to a method of fabricating laminated materials having decorative motifs and surface textures that are mechanically embossed in registration with the decorative motifs.

Because of their look and feel, traditional building and finishing materials, such as fine woods, slate, granite, stones, brick, and concrete are generally preferred by consumers. However, such materials tend to be expensive to produce and to install. For example, while a solid wood floor has a highly valued luxury appearance, in practice the required materials and labor required to install such floors can be prohibitively expensive.

There are many alternatives to traditional building and finishing materials, including laminate and high-pressure laminate boards (HPL). However, in general such alternatives do not possess the realistic look and texture of the traditional building and finishing materials. For example, most alternatives having an outer surface with a wood motif look fake, and thus can readily be identified as something other than traditional wood. Furthermore, while high quality laminate boards or HPL boards may visually look like a traditional wood, their textures readily reveal that they are not.

One problem with most of the alternatives to the traditional building and finishing materials is that their surface textures do not match their decorative motifs. For example, a visual depiction of a wood knot does not match the surface texture characteristics of a wood knot. This significantly reduces the attractiveness of the alternative to consumers.

One prior art approach to matching the surface texture of an alternative material to its decorative motif is chemical embossing. In chemical embossing, the surface texture of the alternative material is developed by chemically reacting an ink that forms the decorative motif with an agent added to a sub-surface layer. While somewhat successful, the resulting surface texture tends to lack the texture sharpness and three-dimensional characteristics of traditional materials.

Another alternative to the traditional building and finishing materials are DPL boards (direct-pressure laminates). However, this alternative does not produce a satisfactory result either.

Another method of forming a surface texture of an alternative material has been suggested, that method being a DPL board with mechanical embossing. This method is interesting because of the possibility of high texture sharpness and high-quality three-dimensional characteristics. However, mechanical embossing the surface texture to match the decorative motif such that the resulting product both looks and feels like a traditional building or finishing material (referred to hereinafter as embossed-in-registration) has been problematic because of the extreme difficulty of accurately registering mechanical embossment with the decorative motif. Furthermore, the difficulty of accurately maintaining an embossed-in-registration alignment during production has prevented mechanical embossed-in-registration systems from becoming a reality.

Accordingly, there is a need for a workable method of fabricating alternative building or finishing materials where the alternatives have the realistic look and feel of traditional products. A method of producing mechanically embossed-in-registration alternative products would be even more beneficial. More beneficial still would be a method of producing mechanically embossed-in-registration alternative products that is commercially viable.

SUMMARY OF THE INVENTION

The principles of the present invention provide for a method of fabricating alternative building and finishing materials that have decorative motifs and surface textures that are mechanically embossed in registration with the decorative motifs.

A method according to the principles of the present invention includes milling a reference edge on a board, and then locating a resin soaked paper having a decorative motif on that board using the reference edge such that the decorative motif has a predetermined position relative to the reference edge. Beneficially, the paper is adhered to the board using static electricity. The board and paper are then moved into a press machine and accurately positioned within the press machine, using the reference edge as a guide, such that the decorative motif assumes a predetermined position relative to a press plate having a predetermined temperature. The press machine is closed, and the hot press plate presses the paper into the board with a predetermined force for a predetermined period of time.

Beneficially, the resin and paper are carefully controlled as to dimensions and material composition. Beneficially, the paper is manufactured by one supplier, on one machine, using materials from the same supplier, and with careful attention to cellulose materials, spool winding directions and spool winding tensions. Beneficially, the resin is manufactured by one supplier, using one reaction vessel, using materials from the same source, and with careful attention to material mixing and solid content.

The press plate, which has a three-dimensional surface, is beneficially manufactured such that the press plate surface matches the decorative motif when the press plate is heated to its operating temperature.

In practice it is generally better to use a slow curing resin and lower press operating temperatures then in the prior art. This improves the quality of the final surface.

If the surface texture has a roughness sufficient to significantly disturb the pressure distribution across the paper and board during embossing, the board can be appropriately hollowed prior to embossing to even out the pressure distribution.

BRIEF DESCRIPTION OF THE DRAWINGS

In the drawings, in which like reference numerals and letters indicate corresponding parts throughout the several views.

DETAILED DESCRIPTION OF THE ILLUSTRATED EMBODIMENT

The principles of the present invention are incorporated in a subsequently described method of mechanically producing an embossed-in-registration building or finishing product.

However, it should be appreciated that while the illustrated embodiment is suitable for implementing embossed-in-registration products, others who are skilled in the applicable arts will recognize numerous alternatives and variations. Therefore, the present invention is intended to extend to all alternatives and variations that come under the broad terms of the claims that follow.

Figure 1:
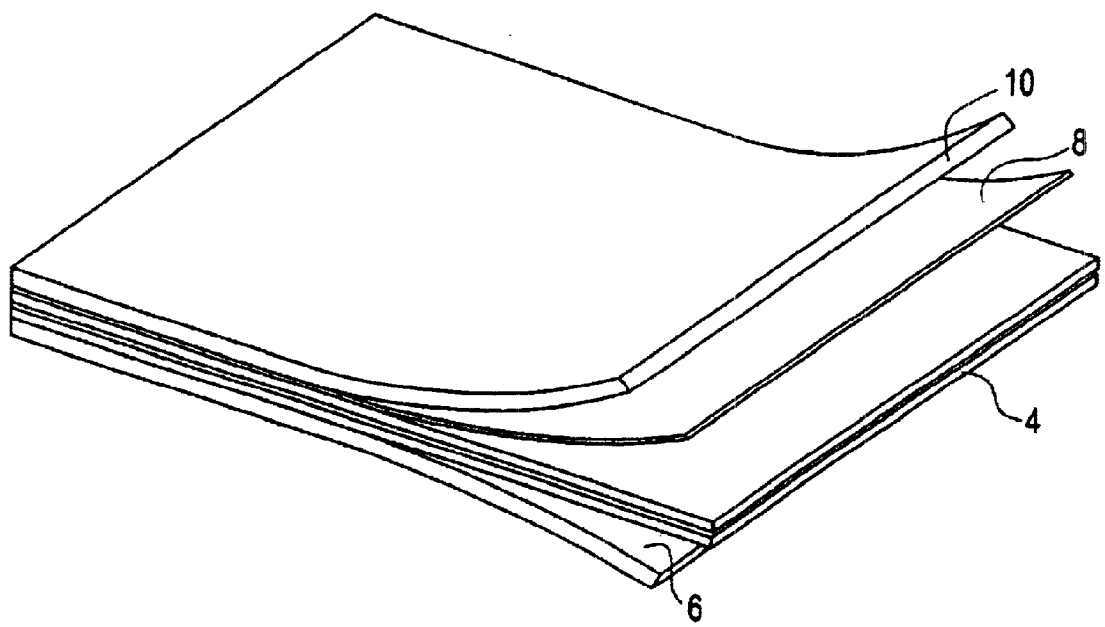
FIG. 1 illustrates a suitable substrate assembly for being mechanically embossed-in-registration.

Direct-pressure laminates (DPL) themselves are well known. Turning now to FIG. 1, prior art direct pressure laminates are typically fabricated from a base board 4, which is a medium density or a high density fiberboard or chipboard. Then, one or more kraft paper sheets 6 (for clarity, FIG. 1 shows only one paper sheet) impregnated with selected resins are located on and/or under the base board 4. Then, a decorative cellulose paper sheet 8 about 0.15 mm thick and impregnated with a melamine solution is placed on the kraft paper sheet. Over the decorative cellulose paper sheet 8 is one or more protective overlay sheets 10. The overlay sheet is made of a highly resistant paper having corundum ($AL_2O_3$) impregnated in a melamine solution. It is also possible to include different papers between the decorative cellulose paper sheet and the base board.

The structure of FIG. 1 is then pressed under heat (180–220° C.) and pressure (approximately 20–30 Kg/cm²) until the resins thermoset. The result is an extremely hard and permanent product called a "direct-pressure laminate (DPL)".

The principles of the present invention relate to improved direct pressure laminates. In those direct pressure laminates the surface texture of the finished product is registered with the decorative motif on a paper sheet. That surface texture is produced by a press machine such as that illustrated in FIG. 2. With reference to that figure, to produce a direct pressure laminate according to the principles of the present invention, a board substrate 20, a melamine resin soaked decorative paper sheet 14, and one or more protective overlay sheets 16 (and possibly other sheets such as a base sheet 18) are accurately located in a press machine. That press machine includes a base 22, a top press 24, and a press plate 26 having a three-dimensional surface. Significantly, the press plate's (described in more detail subsequently) surface includes ridges and/or depressions that are aligned with a decorative motif on the decorative paper sheet 14. The board substrate 20, the decorative paper sheet 14, and the protective overlay sheet 16 (and the base sheet 18, if present) are then heated at 160–220° C. and pressed together at 20–40 Kg/cm for 20 to 60 seconds. This cures the melamine and forms an embossed-in-register direct-pressure laminate product.

Figure 3:
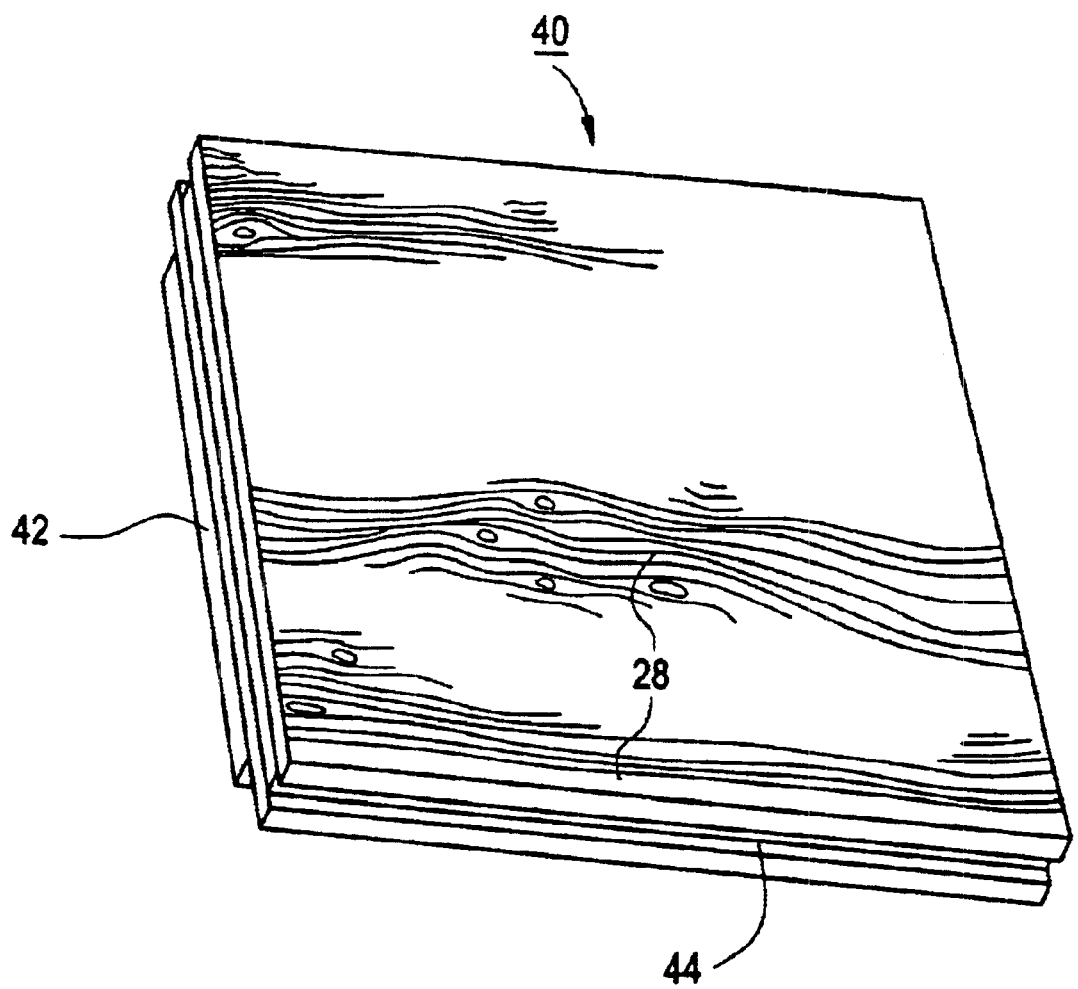
FIG. 3 illustrates an embossed-in-registration product.

Turning now to FIG. 3, the resulting direct-pressure laminate 40 has a surface texture, embossed by the press plate 26, that is registered with a decorative motif 28 on the decorative paper sheet 14. By registration it is meant that the embossed texture coincides or matches with the decorative motif of the decorative paper sheet 14 so as to provide a realistic imitation of a natural material.

Figure 2:
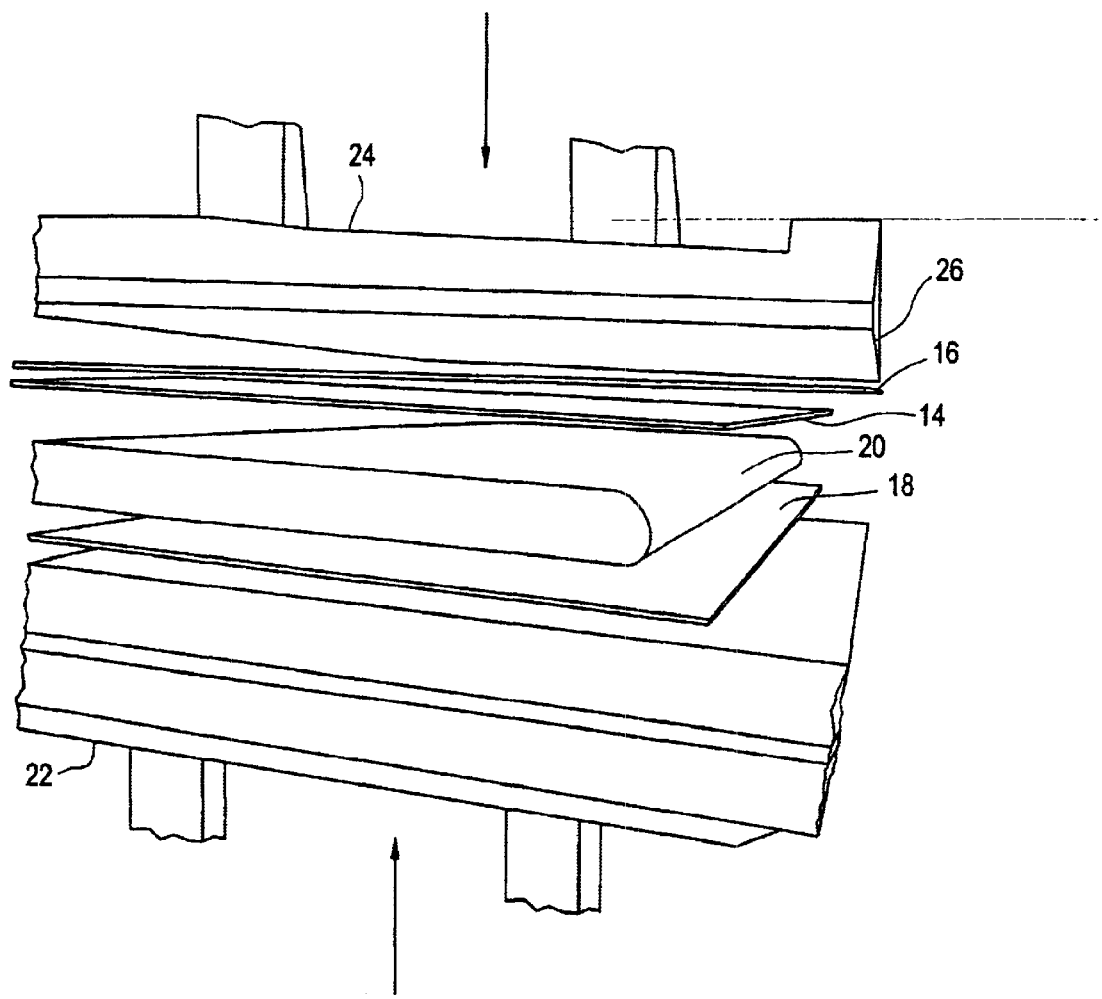
FIG. 2 illustrates a press for producing an embossed-in-registration product.

The various sheets shown in FIG. 2 are similar to those of prior art direct pressure laminate sheets shown in FIG. 1, but the sheets of FIG. 2 have tightly controlled parameters (as discussed subsequently). The board substrate 20 can be a medium density or high density fiberboard (chipboard). Prior to going into the press machine, the decorative paper sheet 14, the one or more protective overlay sheets 16, and the base sheet 18 (if used) are positioned on the board substrate 20. Beneficially, those sheets are attached to the board substrate using static electricity. Furthermore, the protective overlay sheets 16, and the base sheet 18 can be impregnated with a resin, which need not be the same melamine resin used to impregnate the decorative paper sheet 14.

While the foregoing generally describes pressing and heating when fabricating embossed-in-registration products, additional knowledge may be helpful.

First, various parameters of the resins and papers should be controlled such that tight dimensions are ensured, particularly with respect to dilatation, such as during impregnation. In particular, the paper has to be highly homogenous to produce carefully controlled long side and short side dilations. It is convenient to ensure that the paper comes from the same manufacturer. Further, that manufacturer should only use cellulose paste from one origin. That manufacturer should also fabricate all paper on the same paper making machine, using paper fibers with carefully controlled ash content and a consistent color. Additionally, the manufacturer should supply paper from the same location on the manufacturing spool. Also, the paper manufacturer should not rewind the paper since that may change the orientation of the paper fibers. The foregoing helps warrant that the impregnated papers will always have the same final dimensions.

Furthermore, the warehousing of the supplied paper before use is also important. Time, temperature, and humidity should be carefully controlled to help ensure a consistent paper.

All resins (such as melamine) should also be carefully controlled. It is convenient to ensure that the resins come from the same manufacturer. Further, that manufacturer should only use (melamine) powder from the same source, should ensure that all additives have the same quality and are from the same origin, and should mix resins in the same reactor. Great care should be taken to ensure that the supplied resins have a constant solids content. Again, the foregoing helps warrant that the impregnated papers will always have the same final dimensions.

Furthermore, the impregnation process itself should be carefully controlled. When dipping the paper into the melamine resin to impregnate the paper, the paper should undergo a constant, uniform melamine load. This ensures homogeneous absorption of the resins in the paper. To help ensure a constant, uniform load the same impregnation machine should be used for all papers. Furthermore, the impregnation machine band tension and band oscillations, which are very important to the final result, should be very precisely controlled.

The tight control of the paper and resin described above is important. Since the texture of the decorative motif is embossed into impregnated paper, to obtain a quality product an exact knowledge of the dimensions of the impregnated paper is required. Once those dimensions are established it is possible to emboss-in-register using a prefabricated press plate.

The press plate should be carefully designed such that the press plate has the correct dimensions at the operating temperature. When the press plate is in the press machine the press plate is hot, which causes the press plate to dilate. It is when the press plate is dilated that the press plate texture must match the decorative motif of the impregnated decorative paper. Therefore, the dimensions of the decorative motif must compensate for the dilations of the hot press plate. The decorative motif information is provided to the press plate manufacturer, which then fabricates a press plate that is properly registered, when hot, with the decorative motif.

With a properly impregnated paper and a properly designed press plate it is possible to emboss in registration. However, locating the impregnated decorative paper sheet 14 on the board substrate 20 relative to the press plate must be done very accurately to enable a quality embossed-in-registration result. Consideration should be given to the fact that when the press is locked and the board is under pressure, coincidence between the structure of the press plate and the paper decorative motif must be ensured.

Coincidence is achieved using the following general process. First, the board substrate 20 is milled by removing 2 or 3 millimeters from each edge. This produces several reference planes, the board edges, and a board having tightly controlled dimensions. Then, an impregnated decorative paper sheet 14 having an exterior dimension that is 8 or 10 mm smaller than the board substrate 20 is carefully located on the board substrate 20 using a locating systems that uses edges of the board as a reference.

The decorative paper sheet 14 is beneficially attached to the board substrate 20 using static electricity. This avoids relative displacements as the board substrate 20 advances along the production line. Furthermore, the protective overlay sheet 16 (and possibly a base sheet 18) is attached to the board substrate 20.

The decorative paper sheet 14/board substrate 20 is then located on a carriage that feeds the press machine. The carriage advances into the press machine, stops, and passes the decorative paper sheet 14/board substrate 20 structure to positioning tweezers. The tweezers gently lay the decorative paper sheet 14/board substrate 20 structure on the lower press plate. Then, the carriage moves out of the press machine.

After the decorative paper sheet 14/board substrate 20 structure is placed on the lower press plate, another locating system then accurately locates that structure at a predetermined position within the press machine. This locating system beneficially also uses the milled reference edges of the board to position the decorative motif relative to the press plate 26. The press machine is then locked, the interior of the press machine is heated to its operating system, and the upper press plate 24 presses the press plate 26 into the decorative paper sheet 14/board substrate 20 structure, fusing it into one piece. The carriage then moves back into the press machine and removes the final product.

Certain aspects of the embossed-in-registration process are very important. In particular, to avoid porosity problems it is beneficial to impregnate the papers using a slow cured melamine. This means that the press machine operates for a longer period of time and at a lower temperature then in the prior art.

While the embossed-in-registration process described above is suitable for embossed surface textures that are less than about 0.2 mm deep, deeper surface textures can cause a problem. The problem is that deep surface textures, which require relatively large press plate protrusions, tend to disturb the pressure homogeneity across the board surface. This can lead to distortions and inaccuracies in the final product. A solution to that problem is to first hollow out the board's surface where deep surface textures are to be located. Of course, accurately locating the hollowed out portions can be important. This hollowing out process can be done in the pressing line at the same time as the milling of the perimeter described above. Beneficially, using the reference edges to located the hollowed out portions. Alternatively, hollowing can be done on a different line.

The foregoing has illustrated a method of fabricating alternatives to traditional building and finishing materials, where the alternatives have a decorative motif and a press formed surface texture that are registered. That method has various fabrication advantages over the prior art. However, those who are skilled in the applicable arts will recognize numerous additions, variations, and modifications. Therefore, it is to be understood that even though numerous characteristics and advantages of the invention have been set forth, or are obvious to those skilled in the applicable arts, the disclosure is illustrative only and that changes may be made in details. Therefore, the present invention is meant to cover all embodiments that fall within the broad meaning of the following claims.

What is claimed is:

1. A method of fabricating a product, comprising:
   procuring a paper having a decorative motif, wherein that paper is fabricated on a machine such that the paper is wound only once onto a manufacturing spool;
   procuring a melamine resin having a predetermined solid content;
   impregnating the paper using the melamine resin by unwinding the paper from its manufacturing spool and soaking an unwound portion in the melamine resin;
   milling reference edges on a board;
   locating the melamine resin impregnated paper on the board;
   moving the melamine resin impregnated paper and the board into a press machine having a press plate, wherein that press plate has a three dimensional structure;
   using the reference edges to locate the decorative motif within the machine such that the decorative motif has a predetermined location relative to the three dimensional structure; and
   curing the melamine resin impregnated paper to form a direct pressure laminate while pressing the melamine resin impregnated paper and the board using the press plate such that a product having a surface texture that is embossed in registration with the decorative motif is produced.

2. A method of fabricating a product according to claim 1, further including milling a hollow in a surface of the board.

3. A method of fabricating a product according to claim 1, wherein curing is performed at a temperature between 160 and 220° C.

4. A method of fabricating a product according to claim 1, wherein pressing the melamine resin impregnated paper and the board using the press plate is performed at between 20 and 40 $Kg/cm^2$.

5. A method of fabricating a product according to claim 4, wherein pressure is applied for 20 to 60 seconds.

6. A method of fabricating a product according to claim 1, further including locating a base layer under the board.

7. A method of fabricating a product according to claim 6, wherein the base layer is impregnated with a base resin.

8. A method of fabricating a product according to claim 1, further including locating a protective overlay on the melamine resin soaked sheet.

9. A method of fabricating a product according to claim 8, wherein the melamine resin adheres the protective overlay to the product.

10. A method of fabricating a product according to claim 8, wherein the protective overlay is impregnated with an overlay resin.

11. A method of fabricating a product according to claim 8, wherein the protective overlay includes $AL_2O_3$.

* * * * *